3,047,583
VINYLATION OF AROMATIC HETEROCYCLIC NITROGEN COMPOUNDS

Victor A. Sims, Bayonne, N.J., assignor to Air Reduction Company, Incorporated, New York, N.Y., a corporation of New York
No Drawing. Filed Dec. 22, 1959, Ser. No. 861,231
3 Claims. (Cl. 260—313)

This invention relates to the vinylation of aromatic heterocyclic nitrogen compounds. More specifically, this invention relates to the preparation of N-vinyl aromatic heterocyclic nitrogen compounds by a catalytic, vapor phase reaction of acetylene and an aromatic heterocyclic nitrogen compound.

N-vinyl aromatic heterocyclic compounds have generally been prepared in a pressure vessel in which the aromatic heterocyclic nitrogen compound is reacted with acetylene in the presence of a catalyst. In the above method the heterocyclic compound is typically reacted in a liquid medium. There are serious disadvantages in utilizing the above-noted liquid medium reaction method for the preparation of N-vinyl heterocyclic nitrogen compounds; firstly, it is necessary to utilize complex pressure equipment; secondly, the process is not suited for a continuous system but is usually restricted to a batch operation; thirdly, the variation of contact time of the reactants with the catalyst is restricted, and the ratio of reactants cannot be controlled during the course of reaction; and fourthly, it is necessary to employ solvents thereby introducing a twofold added expense, one, the initial cost of the solvent and two, the cost associated with the removal of the solvent from the reaction products.

It is an object of the present invention to provide an efficient improved process for the preparation of N-vinyl aromatic heterocyclic nitrogen compounds.

It is a further object of the present invention to provide a catalyst which is useful for the preparation of N-vinyl aromatic heterocyclic nitrogen compounds.

A still further object is to provide a continuous method for the preparation of N-vinyl aromatic heterocyclic nitrogen compounds by reacting acetylene and an aromatic heterocyclic nitrogen compound having a hydrogen atom on the nitrogen atom, in the presence of a catalyst.

Additional objects and advantages of this invention, if not specifically set forth, will become apparent to one skilled in the art during the course of the following description.

Broadly, the present invention comprises charging a reaction zone with a catalyst and passing acetylene and aromatic heterocyclic nitrogen compounds through the reaction zone under reaction conditions in contact with the said catalyst.

The conditions of the present process are such that the reactants must be in the vapor phase. In order to place the aromatic heterocyclic nitrogen compounds in a vapor phase, it may be introduced as a liquid into a vaporizer wherein it is heated and vaporized. The aromatic heterocyclic nitrogen compound may be mixed with acetylene and the vaporous mixture subsequently passed through the reaction zone. If the aromatic heterocyclic nitrogen compounds have a high boiling point, it is possible to utilize a vacuum system in order to place the compounds in the vapor state. As the gases pass through the reaction zone and contact the catalyst, N-vinyl aromatic heterocyclic compounds are formed by the reaction of the components of the gaseous mixture. The N-vinyl compounds as well as the unreacted starting materials move into a cooled receiver equipped with a condenser. The N-vinyl compound is then separated and the unreacted acetylene may be recycled to the vaporizer and hence through the reaction zone for further reaction. It is obvious that the present process may be operated in a continuous manner with the vapors entering one extremity of the reaction zone and the product and unreacted starting materials collected at the opposite extremity. Since the reactants are continually passing through the reaction zone, the quantity of reactants may be varied as the reaction is proceeding to facilitate the production of optimum yields.

The compounds which may be reacted with acetylene to form the N-vinyl aromatic heterocyclic nitrogen compounds of the present invention are heterocyclic nitrogen compounds which are of the aromatic type and wherein a nitrogen atom contains a free hydrogen. Specific examples of some of the compounds which are utilized in the present invention are: pyrrole, indole, carbazole, imidazole, etc. It has been determined that generally good conversions to the N-vinyl compounds are obtained where about 1 to 3 moles of aromatic heterocyclic nitrogen compound are employed in the reaction mixture with about one mole of acetylene.

The catalyst utilized in the present invention is potassium hydroxide impregnated on a carrier or support such as magnesium oxide or calcium oxide. The catalyst may be prepared by any of the well-known methods used for dispersing an active component, onto a granular support. In a preferred method for preparing the catalyst, the granular magnesium oxide or calcium oxide is heated to about 130° C. under vacuum for several hours in order to degas the support. This heating step will aid in producing a more uniform distribution of potassium hydroxide on the support by enabling a more complete penetration of the impregnating solution. The support is subsequently cooled to about 50° C. and the desired quantity of potassium hydroxide in an aqueous or alcoholic solution is added under vacuum with agitation. The excess solvent is then removed by vacuum distillation and the supported KOH catalyst dehydrated in a vacuum oven for about 3 to 4 hours at 140° C. Magnesium oxide and calcium oxide alone are not vinylation catalysts; however, it appears that magnesium oxide and calcium oxide produce a synergistic effect when employed with the potassium hydroxide in the present reaction as they are far superior to other catalyst systems utilizing KOH such as KOH on charcoal, alumina, etc.

The magnesium oxide or calcium oxide may be impregnated with relatively low percentages of KOH. It is preferred to employ a catalyst containing 5 to 15% potassium hydroxide by weight of support. Catalysts with lower potassium hydroxide concentrations (1 to 15%) will also facilitate the vinylation; however, at a much slower rate and with a shorter catalyst life. Percentages of potassium hydroxide above about 15% do not offer any advantages and in fact may cause uncontrollable and erratic exotherms.

The reactant vapor mixture generally is passed through and contacts a fixed bed of the supported potassium hydroxide catalyst in the reaction zone; however, if desired, fluidized solid contact techniques may be employed.

The temperature utilized in the present invention will vary with the aromatic heterocyclic nitrogen compound being reacted. The temperature of the vaporizer should be slightly above the boiling point of the aromatic amine being vinylated in order to insure a vapor phase. Generally an initial reaction temperature of from 150 to 350° C. will be adequate to assure a vapor phase; however, where higher boiling compounds are to be reacted it may be necessary to carry out the reaction under reduced pressure in order to maintain the reactants in vapor phase. The use of unusually high reaction temperatures is discouraged as it may cause decomposition products which will contaminate the catalyst surface and render it inactive. As the reaction is exothermic in nature, some provision must be made to contain the surge within a certain reaction temperature range. In this regard the temperature of the exotherm should be controlled from about 50 to 100° C. above the initial temperature. Where the exotherm is allowed to go above this point, a resin may be formed which will coat the catalyst and render it inactive.

A preferred embodiment of the present invention is illustrated by the following description.

The apparatus consisted of a vapor phase fixed catalyst bed system. The reactor was comprised of a vertical glass tube (1 inch O.D. x 24 inches long) with a thermocouple well and packed with 6 and 4 mm. glass beads on top for pre-mixing the gases, a central catalyst bed and 6 and 4 mm. glass beads on the bottom as a support for the catalyst. The reactor was heated by a furnace; the temperature inside the reactor being measured along the entire 24-inch length by means of a sliding thermocouple attached to a Guardman indicating controller. The reactor was charged with 100 ml. of catalyst and the catalyst was activated by a rapid stream of nitrogen at a temperature of 300° C. The bed temperature was then lowered to about 50° C. above the boiling point of the aromatic amine being vinylated. Acetylene was passed from a cylinder through a Dry Ice trap to remove any acetone and metered through a calibrated differential flow meter and subsequently through a tower containing, first, 28–48 mesh alumina and, second, 3–14 mesh alumina. Purified grade nitrogen was also metered from a cylinder through a second differential flow meter. The purified acetylene (or nitrogen or mixture of nitrogen and acetylene) was led to the bottom of a vaporizing column (1 inch O.D. x 18 inches long) which was packed with 6 mm. Berl saddles. The acetylene was mixed with the aromatic heterocyclic nitrogen compound which was metered as a liquid from a calibrated Brewer automatic pipetting machine into the top of the vaporizer. The vaporizer was then heated from 50 to 100° C. above the boiling point of the aromatic heterocyclic nitrogen compound used. The preheated acetylene and aromatic heterocyclic nitrogen compound vapors were swept into the top of the reactor. After the inlet gases passed through the catalyst bed in the reactor tube, the resulting effluent gases were led to a cooled receiver fitted with Dry Ice reflux condenser. This condenser was connected to two Dry Ice traps and then to a calibrated wet test meter which measured the non-condensible gases.

A more complete understanding of the present invention may be obtained from the following examples. In each of the examples the procedure and apparatus described above were employed.

*Example 1*

100 ml. of a catalyst consisting of 10 percent KOH by weight impregnated on magnesium oxide formed in the manner described above were charged to the reactor. Acetylene and pyrrole were placed in the vaporizer at a mole ratio of one mole acetylene to 2.2 moles pyrrole. The space velocity was 127 l./hr./l. and the bed temperature averaged 215° C. during reaction. Based on distillation the conversion of acetylene to N-vinyl pyrrole was 50 percent. The N-vinyl pyrrole obtained boiled at 77° C. at 155 mm. pressure and had a refractive index of $n_D^{20}$ 1.5215.

*Example 2*

100 ml. of a catalyst consisting of 10 per cent KOH by weight impregnated on magnesium oxide were charged to the reactor. Acetylene and pyrrole were added at molar ratio of 1 to 1, the space velocity was 98 l./hr./l. and the average bed temperature was 215° C. Based on distillation the conversion of acetylene to N-vinyl pyrrole was 55 percent.

I claim:

1. A process for the preparation of N-vinyl pyrrole comprising contacting in the vapor phase acetylene and pyrrole with a catalyst consisting of a support selected from the group consisting of magnesium oxide and calcium oxide impregnated with from 5 to 15 percent by weight of potassium hydroxide at a temperature of 150 to 350° C. and substantially atmospheric pressure.

2. A process for the preparation of N-vinyl pyrrole comprising contacting in a vapor phase acetylene and pyrrole in the presence of a catalyst consisting of a support selected from the group consisting of magnesium oxide and calcium oxide impregnated with from 5 to 15 percent by weight of potassium hydroxide at a temperature of 150 to 350° C.

3. A process for the preparation of N-vinyl pyrrole comprising contacting in a vapor phase acetylene and pyrrole at a ratio of 1 mole acetylene to 1 to 3 moles pyrrole in the presence of a catalyst consisting of magnesium oxide impregnated with from 5 to 15 percent by weight of potassium hydroxide at a temperature of 150 to 350° C.

References Cited in the file of this patent

UNITED STATES PATENTS

| | | |
|---|---|---|
| 2,066,160 | Reppe et al. | Dec. 29, 1936 |
| 2,123,734 | Keyssner et al. | July 12, 1938 |

OTHER REFERENCES

Reppe: Annalen, vol. 601, pages 128–138 (1956).

UNITED STATES PATENT OFFICE
CERTIFICATE OF CORRECTION

Patent No. 3,047,583 July 31, 1962

Victor A. Sims

It is hereby certified that error appears in the above numbered patent requiring correction and that the said Letters Patent should read as corrected below.

Column 2, line 48, for "1 to 15%" read -- 1 to 5% --; column 3, line 44, after "with" insert -- a --.

Signed and sealed this 11th day of June 1963.

(SEAL)
Attest:

ERNEST W. SWIDER
Attesting Officer

DAVID L. LADD
Commissioner of Patents